UNITED STATES PATENT OFFICE.

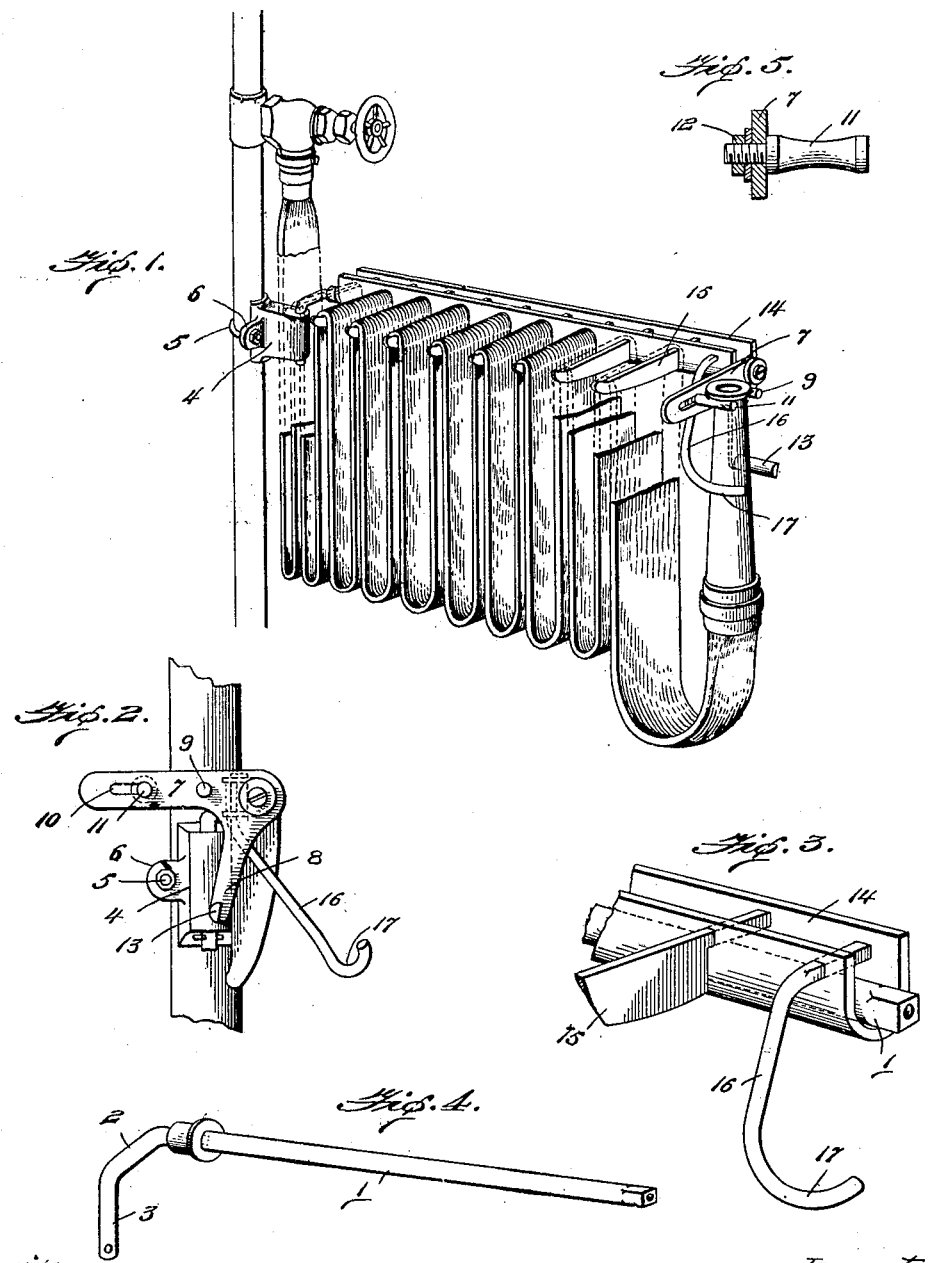

WILLARD D. DOREMUS, OF WASHINGTON, DISTRICT OF COLUMBIA.

HOSE-RACK.

No. 920,116.           Specification of Letters Patent.           Patented May 4, 1909.

Application filed July 5, 1907. Serial No. 382,290.

*To all whom it may concern:*

Be it known that I, WILLARD D. DOREMUS, a citizen of the United States, residing at Washington, in the District of Columbia, have invented certain new and useful Improvements in Hose-Racks, of which the following is a specification.

This invention relates to hose racks of the character adapted for supporting fire hose in buildings.

The object I have in view is to provide a hose rack whereby fire hose may be compactly stored when not in use, and which when the parts thereof are unlocked, by a single act quickly performed by a user, will at once free it from the rack and place it in position for use.

A further object of the invention is to provide a hose rack having the characteristic above mentioned composed principally of parts made from stock material in order that the article may be made with the least amount of labor thus effecting a material saving in cost over racks of this character as usually made.

The invention consists of a hose rack having the general and specific features of novelty of form and arrangement of parts substantially as hereinafter described and claimed.

The invention is illustrated in the accompanying drawing in which:—

Figure 1 is a perspective view of my rack showing a hose in position thereon; Fig. 2, is an end view showing the position assumed when the two members are unlocked; Fig. 3, is a detail view showing the preferred form of the movable member and its relation to the supporting member; Fig. 4 is a perspective view of the supporting member; and, Fig. 5 is a detail view of a part of the means for locking the parts in position adapted for storing hose.

My device contemplates the use of two principal members with their appurtenances. The supporting member 1, is composed of a bar of metal preferably circular in cross section and designed to project from a wall, pipe, or other body to which it is attached. I prefer to maintain it in position by some means which will permit it and the parts carried by it, to be readily swung parallel with a wall or the like in order to be out of the way when not in use, and to be easily moved out when it is desired to disengage the hose which it supports. To this end the inner end of the member 1, is bent at right angles to the main portion, forming the arm 2, and the end thereof is bent to form a projection 3 which is adapted to fit into and move freely in a socket in a bracket by which the rack is supported. In the present illustration of the invention I have shown a supporting bracket adapted for attachment to a water supply pipe consisting of a block 4, having a socket for receiving the projection 3, and a band 5, having screw threaded ends extending through ears 6 on the block and receiving nuts for binding the block in position.

The outer end of the member 1 has attached to it a horizontal arm 7, projecting therefrom at right angles and having formed with it a depending projection 8. The arm 7, has extending from its outer face a stationary pin 9, and it is provided near its outer end with an elongated opening 10, receiving a pin 11. The pin 11, shown in detail in Fig. 5, has its inner end reduced and flattened and extends through the elongated opening in the arm 7, its extreme inner end being screw threaded to receive a nut 12. The shoulder of the pin bears on the outer face of the arm 7 and thus the pin 11 may be moved to increase or diminish the distance between it and the stationary pin 9 and secured in any position to which it is moved.

Extending from the projection 8 is a pin 13, which is in substantially vertical alinement with the pin 9.

The second member 14 of the rack consists of a sheet of metal bent upon itself and preferably formed with a curved bottom of a size to closely inclose the bar 1. Each side of the member 14 is provided with a series of holes, those in one side being opposite those of the other, and into these holes are introduced the ends of fingers 15 which form the support for the hose. The fingers may be of any desired form but are preferably provided with upturned outer ends to prevent dislodgment of the hose when placed on them unless they are allowed to change their position to drop it in the manner to be described hereinafter. The openings in the sides of the portion 14 are preferably slightly smaller than the ends of the fingers to be introduced into them, so that when the fingers are driven into place they will be firmly held and no additional means for securing them is required.

The holes for the reception of the ends of the fingers are so placed in relation to the curved bottom of the member 14 that when the bar 1 is in place in the curved bottom of the member 14 and the fingers are driven into place, the latter will closely confine the bar, and thus an effective means for holding the two members in proper relation to each other is provided.

Extending from one side of the member 14, is an arm 16, which when the parts of the rack are in their normal position extends downward and outward, and its curved end 17 extends to a position below and in line with the pin 11.

In the use of the device the movable member carrying the fingers is moved to bring the fingers to a horizontal position, and there is introduced between the pin 11 and the curved end 17, of the arm 16 on one side, and the respective pins 9 and 13 on the other side, some means preferably a nozzle on the end of a hose to be supported by the rack, by which the parts are retained in place and the rotation of the member 14 on the supporting rod prevented. When the parts are so placed there are presented the series of projecting fingers over the exposed ends of which the hose may conveniently and quickly be looped for storage.

When the use of the hose is required the nozzle or what other means may be used to secure the parts in normal position, is removed thus releasing the arm 16. When this is done the weight of the hose will cause the member 14 to rotate on its supporting rod and swing the fingers to a position to shed the hose and leave it in position for instant use.

The distance between the pins 9 and 11 may be changed when required by moving the pin 11 in the elongated opening through which it projects to permit the introduction and close confinement between the pins of nozzles of different sizes when these are used to hold the parts of the rack in normal position.

Having thus described my invention, what I claim as new and desire to secure by Letters Patent, is:—

1. A hose rack comprising a supporting member, a second member inclosing the first member and capable of revolving around it, the second member being provided with fingers for receiving those, and means for locking the second member, substantially as described.

2. A hose rack comprising a supporting member, means for pivotally mounting the member, a second member inclosing the first and capable of revolving around it, the second member being provided with projecting fingers for receiving hose, and means for locking the second member, substantially as described.

3. A hose rack comprising a supporting member, a second member consisting of a plate bent upon itself inclosing the supporting member and capable of revolving, fingers projecting from the second member for receiving hose, and means for locking the second member, substantially as described.

4. A hose rack comprising a supporting member and a second member consisting of a plate bent upon itself inclosing and capable of rotating on the supporting member, both sides of the bent plate being provided with holes, and fingers having their ends introduced into the holes, whereby a support for hose and means for securing the two members in position in relation to each other is provided, substantially as described.

5. A hose rack comprising a supporting member having locking pins projecting from one end thereof, and a second member consisting of a plate bent upon itself confining and capable of rotating on the member, the second member being provided with fingers for supporting bights of hose and with a projection terminating in line with one of the pins on the supporting member and adapted to coact therewith in locking the second member against turning, substantially as described.

6. A hose rack comprising a supporting member consisting of a rod having at one end an arm provided with two pins, and with a depending projection also provided with a pin, and a second member adapted to rotate on the supporting member and provided with fingers for supporting a hose and with a projection normally terminating below one of the pins on the arm of the supporting member, substantially as described.

7. A hose rack comprising a supporting member consisting of a rod having at one end an arm provided with two pins, one of which is adjustable, and with a depending projection also provided with a pin, and a second member adapted to rotate on the supporting member and provided with fingers for supporting a hose and with a projection normally terminating below one of the pins on the arm of the supporting member, substantially as described.

8. A hose rack comprising a supporting member consisting of a rod bent downward at one end, a bracket having a socket adapted to receive the bent end, a second member inclosing and capable of revolving on the supporting member and provided on one side with projecting fingers for supporting a hose, and means for locking the second member, substantially as described.

9. A hose rack comprising a supporting member consisting of a rod circular in cross section, and a second member consisting of of a plate bent upon itself and adapted to inclose the rod, and fingers having their ends passing from side to side of the bent plate and bearing on the rod, substantially as described.

In testimony whereof I affix my signature in presence of two witnesses.

WILLARD D. DOREMUS.

Witnesses:
   A. G. Du Bois,
   David H. Mead.

Correction in Letters Patent No. 920,116.

It is hereby certified that in Letters Patent No. 920,116, granted May 4, 1909, upon the application of Willard D. Doremus, of Washington, District of Columbia, for an improvement in "Hose-Racks," an error appears in the printed specification requiring correction, as follows: In line 61, page 2, the word "those" should read *hose;* and that the said Letters Patent should be read with this correction therein that the same may conform to the record of the case in the Patent Office.

Signed and sealed this 18th day of May, A. D., 1909.

[SEAL.]

C. C. BILLINGS,
*Acting Commissioner of Patents.*